(12) United States Patent  
Pedersen

(10) Patent No.: US 7,865,506 B1  
(45) Date of Patent: Jan. 4, 2011

(54) METHOD AND SYSTEM FOR FETCHING CONTENT FROM A SERVER IN A CELLULAR COMMUNICATION SYSTEM

(75) Inventor: Claus Pedersen, Vallensbaek (DK)

(73) Assignee: Nokia Corporation, Espoo (FI)

( * ) Notice: Subject to any disclaimer, the term of this patent is extended or adjusted under 35 U.S.C. 154(b) by 1299 days.

(21) Appl. No.: 10/009,499

(22) PCT Filed: Jun. 9, 2000

(86) PCT No.: PCT/IB00/00834

§ 371 (c)(1),  
(2), (4) Date: May 30, 2002

(87) PCT Pub. No.: WO00/78010

PCT Pub. Date: Dec. 21, 2000

(30) Foreign Application Priority Data

Jun. 11, 1999 (GB) ................................ 9913678.0

(51) Int. Cl.  
*G06F 7/00* (2006.01)  
*G06F 15/16* (2006.01)

(52) U.S. Cl. ...................................... 707/726; 709/219

(58) Field of Classification Search .................... 703/3, 703/102; 709/225, 219; 455/419; 370/403; 707/10

See application file for complete search history.

(56) References Cited

U.S. PATENT DOCUMENTS 5,870,770 A * 2/1999 Wolfe .......................... 715/805  
6,138,158 A * 10/2000 Boyle et al. .................. 709/225  
6,167,253 A * 12/2000 Farris et al. ............... 455/412.2  
6,507,867 B1 * 1/2003 Holland et al. ............... 709/219

(Continued)

FOREIGN PATENT DOCUMENTS

JP         08-275236         10/1996

(Continued)

OTHER PUBLICATIONS

Floyd, Rick; Mobile Web Access Using eNetwork Web Express; IEEE Personal Ocmmunication; IEEE Communications Society; US; vol. 5; No. 5; Oct. 1, 1998; pp. 47-52.

(Continued)

*Primary Examiner*—Etienne P LeRoux  
*Assistant Examiner*—Cindy Nguyen  
(74) *Attorney, Agent, or Firm*—AlbertDhand LLP

(57) ABSTRACT

A system, a method, and a cellular communication terminal for fetching content from at least one server. The cellular communication terminal is arranged with a receiver and a transmitter, to receive and transmit data packets from at least one server through links. The link is arranged to transmit the data packets between the terminal and the server arranged with a first memory comprising an identifier and at least one item. The item is provided with an access point, which indicates the location of the server to be accessed. The server is accessed by sending the access point and the identified to the link to identify a first content to be accessed. The first content is associated with link content, which is provided at different locations in the server or on other servers. A browser application is arranged in the terminal, to establish a session to link, by reading an item from the first memory.

24 Claims, 6 Drawing Sheets

U.S. PATENT DOCUMENTS

| | | | |
|---|---|---|---|
| 6,587,684 B1 * | 7/2003 | Hsu et al. | 455/419 |
| 6,661,784 B1 * | 12/2003 | Nykanen | 370/338 |
| 6,681,259 B1 * | 1/2004 | Lemilainen et al. | 709/250 |
| 2001/0003828 A1 * | 6/2001 | Peterson et al. | 709/219 |
| 2001/0032254 A1 * | 10/2001 | Hawkins | 709/219 |
| 2001/0040945 A1 * | 11/2001 | Fujino et al. | 379/93.09 |
| 2002/0109706 A1 * | 8/2002 | Lincke et al. | 345/700 |

FOREIGN PATENT DOCUMENTS

| | | |
|---|---|---|
| WO | 99/35593 | 7/1999 |

OTHER PUBLICATIONS

Kaashoek, Frans Kaashoek; "Dynamic Documents: Mobile Wireless Access to the WWW"; Proceedings, Workshop on Mobile Computing Systems and Applications; Dec. 8, 1994; p. 179-184.

International Search Report.

Wang, Z., et al. "Prefetching in World Wide Web, Global Telecommunications Conference," 1996 GLOBECOM '96. 'Communications: The Key to Global Prosperity, Nov. 1996'.

* cited by examiner ically a cellular network. Current off-line browsing is limited to content stored in the cache memory of the cellular phone. The present invention ensures that the user will get a selection of relevant data stored in the phone, before the user is going off-line.

METHOD AND SYSTEM FOR FETCHING CONTENT FROM A SERVER IN A CELLULAR COMMUNICATION SYSTEM

BACKGROUND OF THE INVENTION

1. Field of the Invention

The invention relates to a cellular terminal, method and a system for fetching content from a server to a cellular terminal.

2. Description of the Prior Art

The Wireless Application Protocol (WAP) is a result of continuous work to define an industry wide standard for developing applications over cellular communication networks. This makes it possible to access for example the Internet or other kinds of information networks provided with hypermedia servers, from an ordinary cellular phone supporting WAP. These types of cellular phones which support WAP, have only a small fraction of the resources of a typical desktop or portable computer. This means that the features in the phone are very limited compared to a computer. The reason for this limitation is the size of the phones, i.e. the phone has a severe limitation in processing power, memory space, display size and buttons or keys by which a user can request, view and manipulate information obtained from a hypermedia server. Therefore, it is very important that the features in the phone are made as efficient as possible. Also, the relatively high cost for a call from a cellular phone makes it also very important to provide the client with a fast response from the server.

The WAP Architecture is very similar to the Internet Architecture. FIG. 1 shows a comparison between the Internet Architecture 10 and the WAP Architecture 20. The Internet Architecture 10 comprises a Hypertext Markup Language (HTML) 12, e.g. Java Script, a Hypertext Transfer Protocol (HTTP) 14, Transport Layered Security (TLS) I Secure Sockets Layer (SSL) 16, and a Transport Configuration Protocol (TCP) I User Datagram Protocol (UDP) 18.

The Internet Architecture 10 is well known prior art, and is disclosed in e.g. in U.S. Pat. No. 5,657,390. The WAP Architecture 20 comprises a Wireless Application Protocol (WAE) 22 corresponding to HTML 12, a Wireless Session Layer (WSP) 24 corresponding to HTTP 14, a Wireless Transport Layered Security (WTLS) 26 corresponding to TLS/SSL 16, and a Wireless Transport Layer (WTP) 28 corresponding to TCP I UDP 18. Furthermore, the WAP Architecture comprises different bearers 29 like e.g. SMS, USSD and CDMA 30. There is also a possibility to implement different kinds of services and applications in the WAP Architecture, e.g. Value Added Services (VAS). The WAP Architecture 20 is well known prior art and is therefore not being disclosed any further. More detailed information about WAP can at present be found at the following Internet address: http://www.wap-forum.org/

A Wireless Application Environment which forms a upper layer of the WAP stack includes a browser application, even called a microbrowser. The browser uses wireless mark-up language (WML) and a lightweight mark-up language, WMLScript a lightweight scripting language. WML implements a card and deck metaphor. The interaction of the browser and user is described in a set of cards which are grouped together into a document commonly referred to as a deck. The user navigates to a card in a deck reviews its content and then navigates to another card in the same deck or in a different deck. Decks of cards are transferred from origin servers as needed.

U.S. Pat. No. 5,895,471 discloses a way of storing hypermedia links, used by a cellular phone. The hypermedia links are stored as bookmarks on a server to save memory space in the phone. The hypermedia links could be identified as uniform resource locators (URL), which are used to identify and control access to resources on a network like the Internet. U.S. Pat. No. 5,895,471 also gives a basic indication of how WAP is working, e.g. it describes how the hypermedia information is organized into cards and decks. Instead of referring to WML, they refer to a language mentioned as Handheld Device Markup Language (HDML). Furthermore, it is mentioned that the phone can be provided with a cache memory, to store received decks from a hypermedia link. Thus, it is possible that the phone first consults the cache to determine if a requested deck is available in the phone. If the deck is available, it can be accessed without requiring any communication with the network. It is also mentioned how to store navigation history of hyperlink traversals and a history of user activity.

However, in some cases, history and bookmark information is not always well suited for navigation. While some of the content in the decks or cards may include internal hypermedia links that point to different locations within the same deck/card, history and bookmark information permits navigation within such decks/cards only to particular locations specified by the internal hypermedia links, instead, separate mechanisms such as scroll bars must be used as the principal mechanisms for navigating to particular locations within decks/cards. Consequently, an end user is often forced to consciously click on different objects in a graphical user interface depending on different objects in a graphical user interface depending upon whether the end user wishes to navigate between decks/cards or to navigate within decks/cards. As a result, navigation with this type of user interface is slow and burdensome for many end users.

As mentioned in U.S. Pat. No. 5,895,471, it is possible to access content from an earlier session, even when the phone is out of coverage, if the content has been stored in the cache. However, even if the user has downloaded to the cellular phone with a hierarchy of cards/decks from hypermedia links, the user cannot always rely on that all the links have been stored in e.g. a cache memory. One reason, for the deck/card not being stored in the cache, could be that the user did not access this deck/card. Another reason could be that one of the cards/decks was deleted during a visit to other links, e.g. older cards/decks saved in the cache are dropped to allow new cards/decks to be stored instead. Typically, the cards/decks which are deleted/inserted according to a First In First Out (FIFO) principle. Furthermore, the user cannot be sure if all the content stored in the cache connected to the same cards/decks is updated. For example, if the content on the server has changed, and includes new links which will not be apparent in an update with the server. Accordingly, the user will not be able to receive this information, since the update is mostly related to the existing decks/cards in the cache.

Therefore, a significant need exists for a manner of ensuring that the phone has received the latest content together with associated links, which could be relevant for the user. Moreover, there is a need for the user to facilitate a download of decks/card, especially to access content at a later occasion e.g. when the user is in an out of coverage area, or so called off-line.

SUMMARY OF THE INVENTION

The present invention facilitates the user to browse when the terminal is not connected to a network, like the Internet, without having the need to download further content related to the already downloaded content. Thus, the user is enable to browse around in downloaded content when using the terminal for so called off-line browsing.

According to one aspect of the invention, there is provided a cellular communication terminal for fetching content from at least one server, the terminal comprising:
- a receiver and a transmitter which receives and transmits data packets from at least one server through a link which transmits the data packets between the terminal and the server;
- a first memory comprising an identifier and at least one item, the item is provided with an access point which indicates the location of the server to be accessed, wherein the server is accessed by sending the identifier to the link to identify a first content to be accessed at the server, the first content is associated with link content provided at different locations in the server or in another server;
- a browser application which establishes a session to a link by reading an item from the first memory, and fetches a copy of the first content from the server, at the location indicated by the access point, to be stored in the first or in a second memory, wherein the second memory temporarily or permanently stores the copy of the first content; and
- a user interface connected to the browser application having a display which displays the copy of the first content received from the server and user input to control the browser application;
- wherein a copy of the first content and a copy of the link content is fetched simultaneously upon a request generated by the browser application, the request is sent through the transmitter as a data packet, comprising an instruction to the server to send a copy of the first content from a given location in the server, indicated by the access point, together with a copy of the link content, simultaneously.

Thus, the requested content is being sent to the user, as a single response to a request made by the user, wherein the response can comprise one or several data packets sent in series. Thus, if the user wishes to receive further content which is linked to the first content, it is not necessary for the user to access the content before using the content in an off-line browsing. In this manner, the user is able to fetch the latest content from a server, and use the latest content when going off-line. This is particularly advantageous when the user is out of coverage of a cellular network, to which the user subscribes. It is also very useful for users who are traveling abroad, and are connected to a foreign network which is mostly far more expensive than the home network. Also, it enables the user to download the content when having access to a high-band channel, like General Packet Radio Service (GPRS) and/or High Speed Circuit Switched Data (HSCSD). It could also be possible for the user to use a cheaper bearer, like the user's home cellular network and/or virtual Private Automatic Branch Exchange (PABX) on a local charge.

A further aspect of the invention is a method for fetching content from at least one server to a cellular communication terminal, the communication terminal comprising a first memory and a browser application, wherein the method comprises the following steps:
- reading an item in the first memory and an identifier, by means of said browser application, the item comprising at least one access point indicating the location of a server to be accessed;
- generating a request by means of the browser application, the request comprising information of the requested access point, and the identifier identifying a first content of the requested access point, the first content is associated with link content provided at different locations in the server or in another server;
- initiating a session to a link, by transmitting the request from the communication terminal to the link, the link sending;
- data packets between the terminal and the server; identifying the request at the link, and
- establishing a session between the terminal and the link by sending a response from the link to the terminal wherein the request, generated by means of the browser application, include an instruction to the server to send a copy of the first content from a given location in the server, indicated by the access point, together with a copy of the link content, simultaneously, and the cellular communication terminal fetches a copy of the first content and a copy of the link content simultaneously.

A still further aspect of the invention is a system for fetching content from at least one server the system comprising:
- a cellular communication terminal including;
- a receiver and a transmitter which receives and transmits data packets from at least one server through a link which transmits the data packets between the terminal and the server;
- a first memory comprising an identifier and at least one item, the item is provided with an access point which indicates the location of the server to be accessed, wherein the server is accessed by sending the access point and the identifier to the link to identify a first content to be accessed, the first content is associated with link content provided at different locations in the server or in another server;
- a browser application, which establishes a session to the link by reading an item from the first memory, and fetches a copy of the first content from the server, at the location indicated by the access point, to be stored in the first or in a second memory, wherein the second memory temporarily or permanently stores the copy of the first content; and
- a user interface connected to the browser application, including a display which displays the first content and user input means to control the browser application;
- a cellular communication network, which establishes a connection between the cellular communication terminal and the linking; the link enabling a session for the cellular communication terminal and transmitting data packets between the terminal and a server; and
- at least one server, which receives and/or transmits data packets from/to the terminal;
- a copy of the first content and a copy of the link content is fetched simultaneously upon a request generated by the browser application, the request is sent through the transmitter as a data packet, comprising an instruction to the server to send a copy of the first content from a given location in the server, indicated by the access point, together with a copy of the link content, simultaneously.

Another aspect of the invention, is a communications device for accessing a server accessible via a proxy, the device comprising a transceiver and a browser, the transceiver being operable to establish a session with a proxy, the proxy providing access to a server wherein the browser is operable to retrieve first content from the server together with further content linked to the first content.

A particular advantageous embodiment, is to provide the cellular communication terminal with an external memory, provided with a connection to be inputted to the terminal. This will enable the user to have greater flexibility when accessing stored content, since the user is able to handle the stored content whenever the user chooses. For example, if the user is going on a journey, and would like to create a database of information connected to the geographical location to be visited, then the information can be stored in this external memory and accessed whenever the information is needed. Thus, since an internal memory in the terminal is quite limited, this will save valuable memory space as well as providing the user with greater flexibility.

BRIEF DESCRIPTION OF THE DRAWINGS

The invention will be described in greater detail in the following by way of example only and with reference to the attached drawings, in which.

DESCRIPTION OF THE PREFERRED EMBODIMENTS

Figure 1:
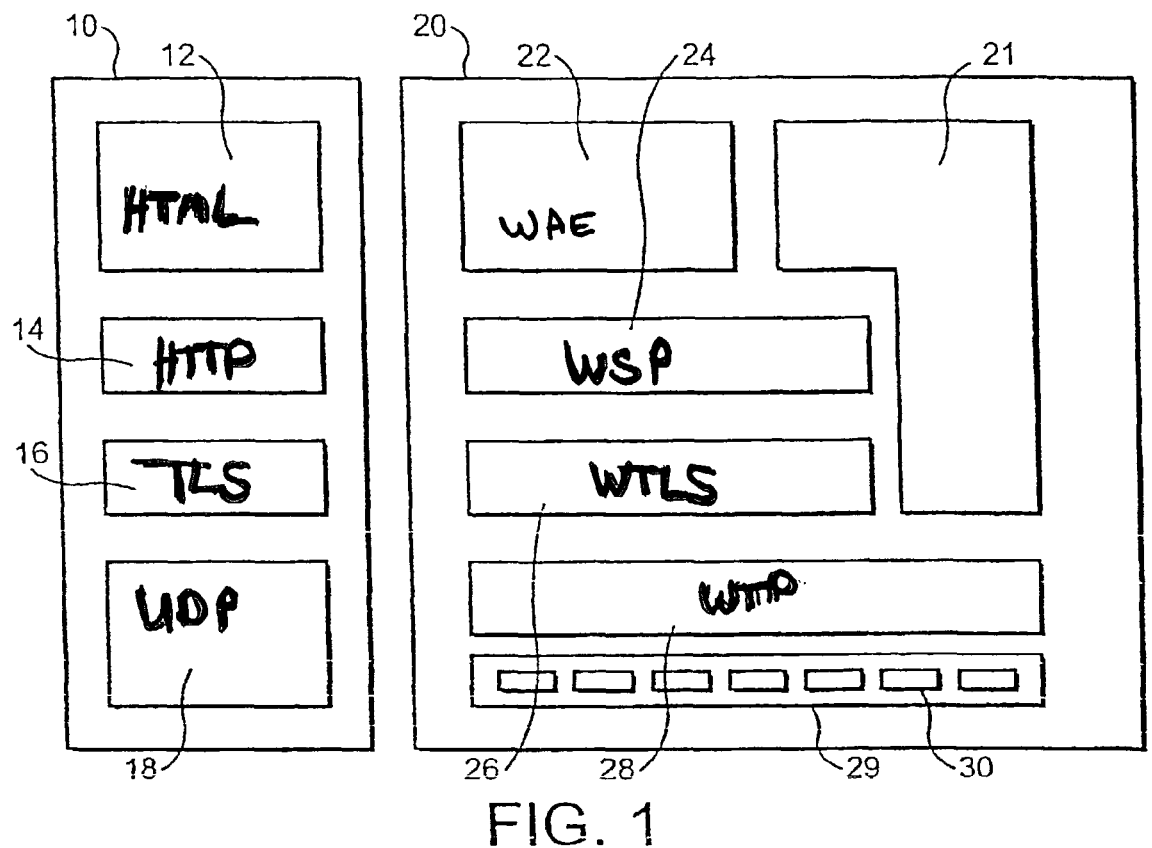
FIG. 1 shows a comparison between the Internet Architecture and the WAP Architecture.
Figure 2:
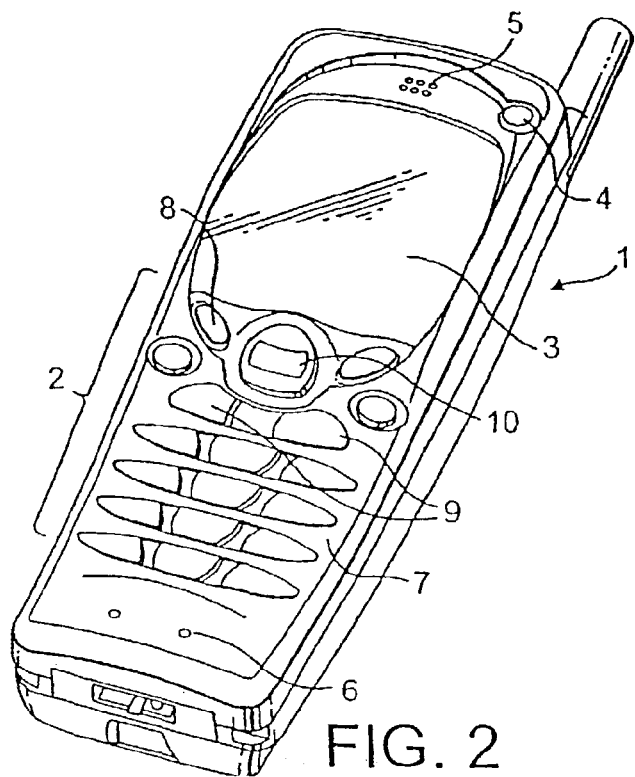
FIG. 2 schematically illustrates a preferred embodiment of a hand portable phone according to the present invention.

FIG. 2 shows a preferred embodiment of a cellular communication terminal, hereafter also referred to as a phone, according to the present invention. The phone, which is generally designated by 1, comprises a user interface having a keypad 2, a display 3, an on/off button 4, a speaker 5, and a microphone 6.

The phone 1 according to the preferred embodiment communicates via a cellular telecommunication network, e.g. a cellular network. However, the phone could also have been designed for a cordless network. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0-9" or a sign "#" or "*", respectively. In alpha mode each key is associated with a number of letters and special signs used in text editing. The keypad 2 additionally comprises two soft keys 8, two call handling keys 9, and a navigation key 10.

The two soft keys 8 have a functionality corresponding to what is known from the phones Nokia 2110™, Nokia 8110™ and Nokia 3810™. The functionality of the soft key depends on the state of the phone and the navigation in the menu by using a navigation key. The present functionality of the soft keys 8 is shown in separate fields in the display 3 just above the keys 8.

The two call handling keys 9 according to the preferred embodiment are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key by simply pressing the up/down key using his/her thumb, i.e. it allows the user to scroll between a group of items in e.g. a menu provided in the user interface. Since many experienced phone users are used to one-hand control, it is a very good solution to place an input key, requiring precise motor movements. Thus, the user may place the phone in the hand between the finger tips and the palm of the hand. Hereby, the thumb is five for inputting information. In another embodiment, the scroll key can be a roller key (not shown), which is arranged to rotate in one or several directions. The roller allows the user to roll the key to scroll between different items in a menu. In case of a roller key, the soft key 8 could be arranged to the roller, i.e. upon pressing on the roller the same functionality, as the operation key has, could be entered. The roller key has a functionality corresponding to what is known from e.g. the phone Nokia 7110™, which also supports the Wireless Application Protocol (WAP). The roller key is incorporated by reference in U.S. patent application Ser. No. 08/923,696.

Figure 3:
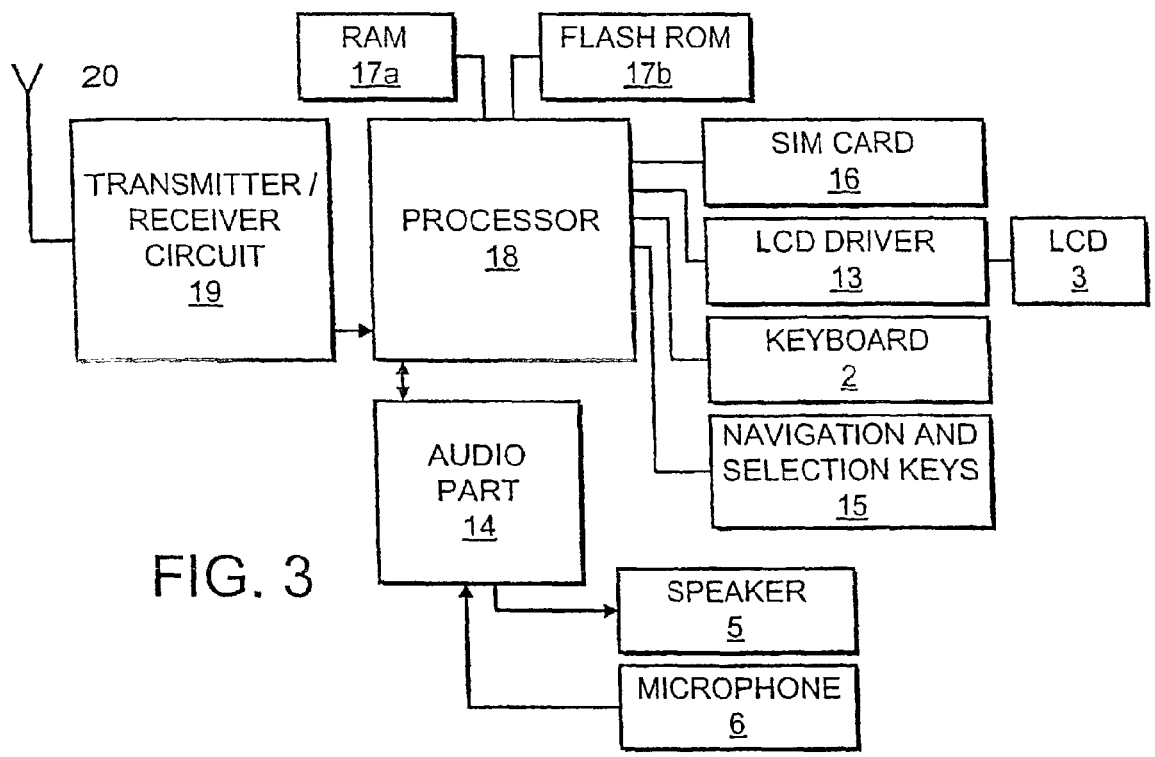
FIG. 3 schematically shows the essential parts of a telephone for communicating with a cellular or cordless network.

FIG. 3 schematically shows the most essential parts of a preferred embodiment of the phone. These parts are essential to understand the invention. The preferred embodiment of the phone of the invention is used in connection with a GSM network, but, of course, the invention may also be applied in connection with other phone networks, such as other kinds of cellular networks and various forms of cordless phone systems or in dual band phones accessing sets of these systems/networks. The microphone 6 records the user's speech, and the analog signals formed thereby are A/D converted in an A/D converter (not shown) before the speech is encoded in an audio part 14. The encoded speech signal is transferred to a control 18. The control 18 comprises a processor, which may support software in the phone. The control 18 also forms the interface to the peripheral units of the apparatus, wherein the peripheral units can comprise a RAM memory 17a and a Flash ROM memory 17b, a SIM card 16, the display 3 and the keypad 2 (as well as data, power supply, etc.). The control 18 communicates with a transmitter/receiver 19, e.g. a circuit which sends/receives a request/response to/from a telecommunication network. The audio part 14 speech-decodes the signal, which is transferred from the control means 18 to the earpiece 5 via a D/A converter (not shown).

The control 18 is connected to the user interface. Thus, it is the control 18 which monitors the activity in the phone and controls the display 3 in response thereto. Therefore, it is the control 18 which detects the occurrence of a state change event and changes the state of the phone and thus the display text. A state change event may be caused by the user when he activates the keypad including the navigation key 10, and these type of events are called entry events or user events. However, the network communicating with the phone may also cause a state change event. This type of event and other events beyond the user's control are called non-user events. Non-user events comprise status change during call set-up, change in battery voltage, change in antenna conditions, message on reception of SMS, etc.

Figure 4:
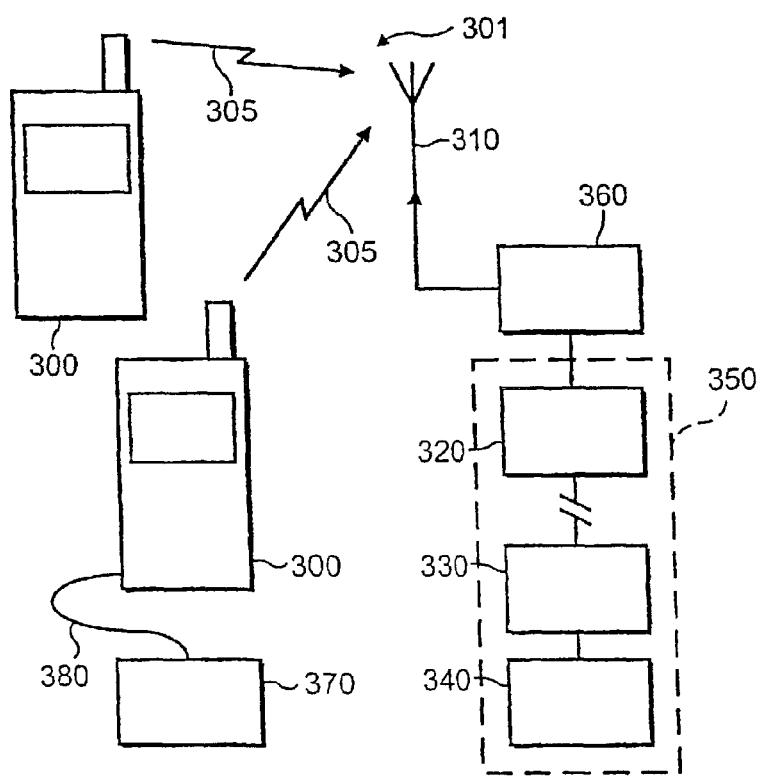
FIG. 4 schematically shows a connection between a communication terminal and different servers in a network, according to a preferred embodiment according to the present invention.

Fetching Content from a Server to be Used in a Cellular Communication Terminal FIG. 4 schematically shows a system 301, comprising a cellular communication terminal 300, a cellular network 310, and a plurality of web servers 320, 330 and 340 in an Internet network 350. The Internet network 350 uses World Wide Web (WWW) protocols. The cellular network 310 establishes a wireless connection 305 between a plurality of cellular terminals 300 and link 360. Even if the gateway is usually connected to a server to be accessed, it is possible that the gateway may be integrated together with the server to be accessed, as well.

The terminals 300 are able to access one of the web servers 320-340 via the link 360. The terminals 300 could typically be a cellular phone. In general, the link 360 is arranged to enable a session for the cellular communication terminal 300 and to transmit data packets between the terminal and one of the web servers 320-340. Thus, the web servers 320-340 are arranged to receive and/or transmit data packets from/to the terminal 300. The transfer of data packets is often mentioned as pull and/or push. A pull could be described as the terminal using an access point to access a location where the provider information is stored, and might also determine whether it has been updated and to retrieve it if necessary. In some cases it could also be possible to use a push, which could be described as the opposite to pull, i.e. the server maintains address data necessary to transfer updated information to the terminal.

The link 360 in this example is typically a gateway or a proxy, but is hereafter referred to as gateway. A proxy server is a process that allows the user to fetch different types of documents, like WWW, FTP, and GOPHER documents. The proxy server can store the documents in a cache memory in the radio terminal. What this means is that when anyone retrieves a document, besides transferring these files to the radio terminal, a copy is also made on the local host. Thus, the next time the user accesses that document, a request is sent to the remote host to see if the page has been updated, and if not, it is read directly from the cache memory. A gateway can be a computer that lies at the intersection of a server to be accessed and a client, and routes traffic from one or several servers to the client. Thus, the function of the gateway is to provide a link between two disparate types of electronic communications such as WAP architecture and Internet architecture. Communication between a cellular terminal 300 and the gateway 360 is according to the Wireless Application Protocol (WAP).

WAP defines a set of standard protocols that enable communication between cellular communication terminals, like cellular phones and network servers. Other types of communication terminals could be pagers and personal digital assistants. WAP uses a standard naming model according to which standard Internet URLs are used to identify content on different web servers. It also uses content typing. All WAP content is given a specific type consistent with WWW typing which allows a cellular terminal to correctly process the content based on type. WAP also uses standard content formats and standard communication protocols. Thus, WAP brings Internet content and advanced data services to cellular terminals. WAP can work across differing cellular network technologies and bearer types (GSM, CDMA, SMS). Communication between the web servers 320-340 and the gateway 360 is according to WWW protocols.

In this embodiment, the gateway 360 translates requests from a WAP protocol stack used by the cellular terminal 300 to a WWW (World Wide Web) protocol stack used by the web server. The web server can for example return WAP content such as WML (Wireless Markup Language) or WWW content such as HTML (HyperText Markup Language). In the later case a filter is used to translate the WWW content to WAP content e.g. HTML to WML. The gateway also encodes content sent over the cellular network to the cellular terminal and decodes data sent to it by the cellular terminal. A Wireless Application Environment which forms an upper layer of the WAP stack includes a browser application, also called a microbrowser. The browser uses WML and a lightweight markup language, WMLScript a lightweight scripting language. WML implements a card and deck metaphor. The interaction of the browser and user is described in a set of cards which are grouped together into a document commonly referred to as a deck. The user navigates to a card in a deck reviews its content and then navigates to another card in the same deck or in a different deck. Decks of cards are transferred from origin servers as needed. Thus, the content which the user receives mostly from a server comprises cards and decks.

The cellular communication terminal differs from a desktop or a portable computer with Internet facilities in that generally it has a less powerful CPU, less memory, restricted power consumption, smaller displays and more limited input devices. The cellular network differs from the Internet network in that it generally has less bandwidth, more latency, less connection stability and less predictable availability. The WAP architecture is optimized for narrow bandwidth bearers with potentially high latency and is optimized for efficient use of device resources.

In order to communicate with the cellular network 310 and to receive and transmit data packets from e.g. the web server 320 through the gateway 360, the cellular communication terminal 300 comprises a receiver and a transmitter. See also FIG. 3 ref. no. 19. The terminal 300 further comprises a first memory. See FIG. 3 ref. no. 16 (SIM card) and 17b (ROM), provided with an identifier and at least one item. The item is provided with an access point which indicates the location of the server to be accessed, which could be indicated by means of a URL (Uniform Resource Locator) address. In addition, the item can also comprise data packets from earlier sessions which is updated upon a new session to the same access point. The identifier is used to identify a first content at the address provided by the server, wherein the server is accessed by sending the identifier to the link to identify which type of content is requested at the server. In addition, the first content is associated with link content, which is provided at different locations in the server 320 or in another server 330, 340.

Also, the item can comprise a script, which is arranged to provide provisions for accessing servers through linking means. The script can activate or download linking applications from a gateway, i.e. an application which makes it possible to receive and/or transmit different types of data packets between the server and the terminal. For example, the different types of data packets can be a particular text format, software programs, picture formats. This allows the processing power of the terminal to be less restricted, by using a standard WAP browser and provides flexibility for new features. This can be done by creating extensions to WML and WML script. Thus, the script can make it possible to access data packets, which might not be supported by the software in the terminal, by downloading the appropriate application, supporting the type of data format, directly to the terminal. In general, the data packets, can be data (content) stored or generated at an origin server 320. The first content of the data packet is typically displayed or interpreted by the client.

As mentioned before, the Wireless Application Environment forms an upper layer of the WAP stack, and includes a browser application. To access different servers the terminal must be provided with a browser application, like a so called microbrowser. The browser application is arranged to establish a session to at least a first gateway by reading the item in, the first memory. Also, the browser application also fetches a copy of the first content from the server 320, at the location indicated by the access point.

In accordance with the present invention, a copy of the first content and a copy of the link content is fetched simultaneously, upon a request generated by the browser application. This request is arranged to be sent through the transmitter as a data packet. The request comprises an instruction to the server to send a copy of the first content from a given location in the server, indicated by the access point, together with a copy of the link content, simultaneously. By simultaneously means that the requested content is being sent to the terminal, as a single response to the request, wherein the response can comprise one or several data packets sent in series. Thus, upon sending this request to the server, all link content associated with the first content is downloaded to the terminal. For example, this could mean that the user interface is displaying an option, when using the browser application, giving the user an opportunity to download all or parts of the content related to a so called homepage. The location of the homepage, in the server, is indicated by the access point. The content related to the homepage comprises, in general, several link content which is related to the same location of the homepage. There might also be other links, which are related to another homepage, at another location, which means that the total amount of content could be quite large. Therefore, in a preferred embodiment of the present invention, the first content and the link content, to be downloaded into the phone, could be restricted to the same server. Naturally, it can be possible that the server sends information about the content provided on the server, like the number of content, the size of the content, content to other locations, etc. In this manner, it will be possible for the user to choose what content he would like to receive, and receive the content upon a downloading request, i.e. by using the pull means provided in the browser application.

Figure 6A:
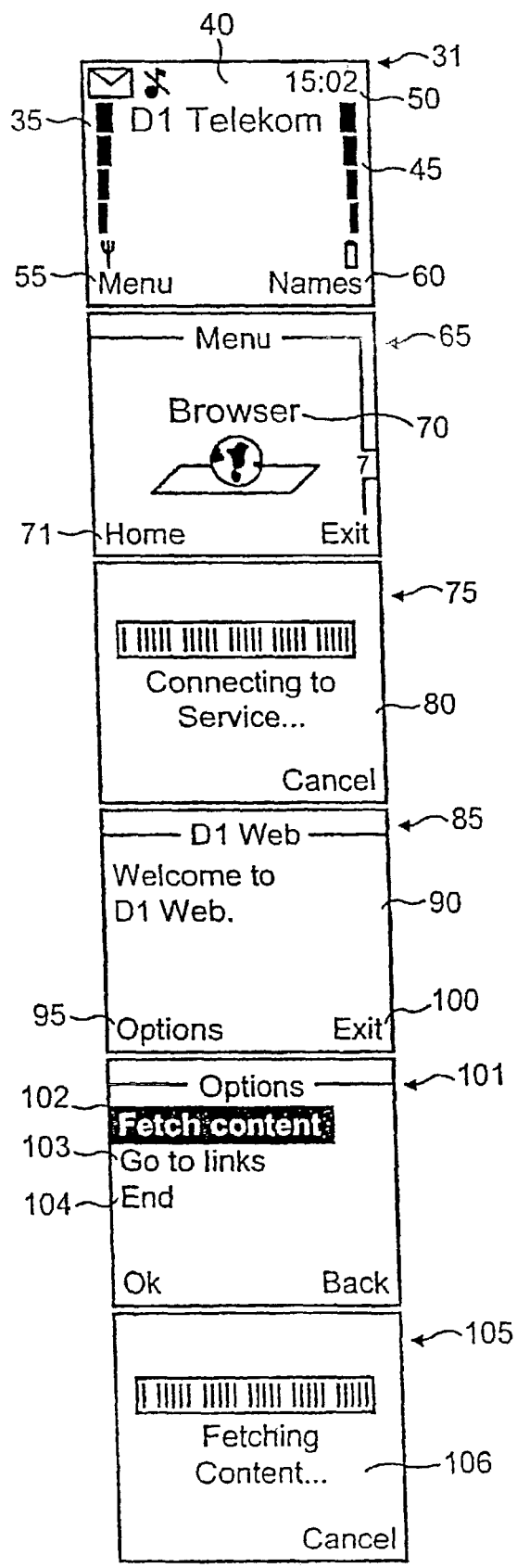
FIGS. 6a-c shows an example of a user interface in a phone according to the present invention.
Figure 6B:
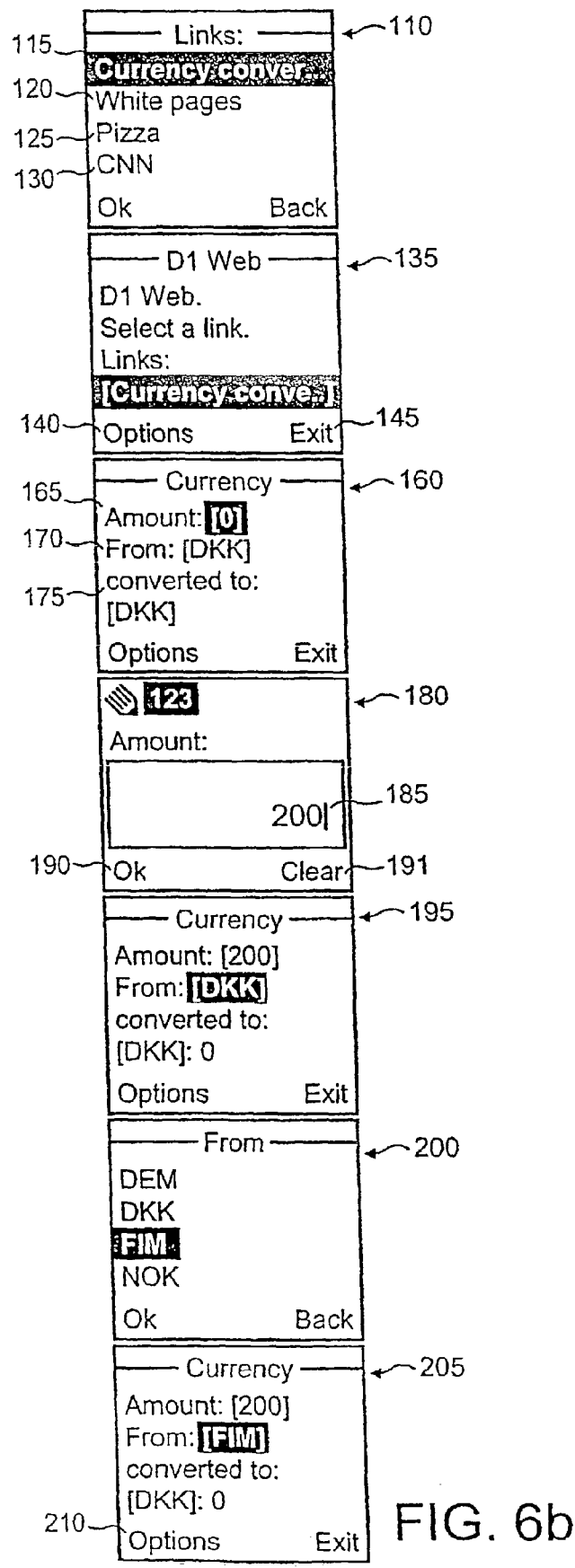
Figure 6C:
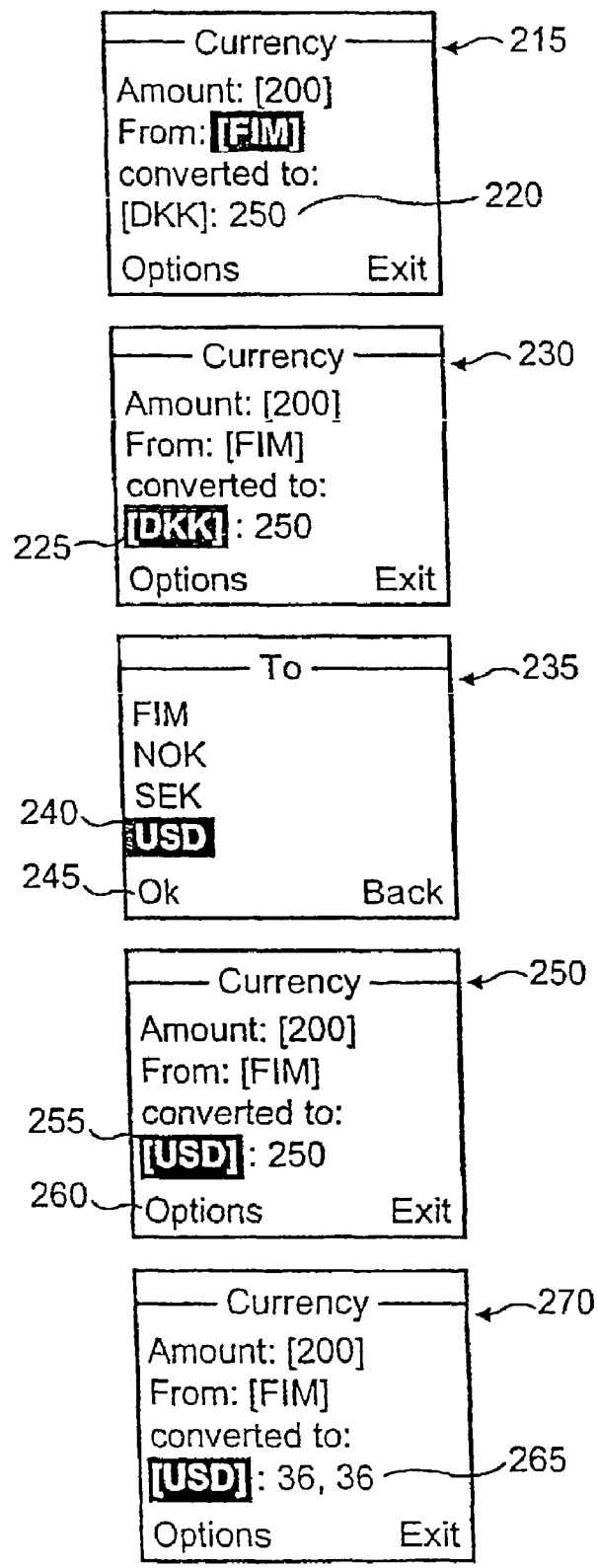

The copy of the first content is stored in the first or in a second memory of the terminal. The second memory could be a cache memory, (the RAM memory 17a in FIG. 3) which enables the user to temporarily store content, but it could also be a permanent memory like a ROM memory. A user interface is connected to the browser application having a display for displaying the first content and user input to control the browser. An example of how the user interface can be displayed during a session is shown in FIGS. 6a-c. The input means is shown in FIG. 2 as the keypad 2. The browser can be arranged in a ROM memory or on a SIM card, as shown in FIG. 3 ref. No. 17b and 16, respectively.

In another preferred embodiment, the second memory could be an external memory 370, provided with a connection 380 to be inputted to the terminal. The connection 380 can comprise a wired link or a wireless link (like an infra-red link or a low power RF link (e.g. Bluetooth)). If it comprises a wired link, it can also comprise a cable provided with electrical plugs, to physically connect the cache to the terminal. If the connection is a wireless link, it is suitable to provide the terminal with an appropriate protocol, to control the access to the second memory. Naturally, the wired link should also be provided an appropriate protocol, to control the access to the second memory. The external memory 370 could provide greater flexibility to the user. For example, one who would like to save content to be used at different occasions in the future, or one who would like to save more content than the internal memory could provide. Naturally, the external memory could also be a cache memory.

As an alternative, it can also be possible to save the content from a session in a permanent storage memory, which means that the user is able to confirm if the content is going to be saved or deleted. The permanent storage memory could be identified as the SIM card 16 and/or the ROM memory 17b as shown in FIG. 3.

A Method for Fetching Content Through a Cellular Communication Terminal

Figure 5:
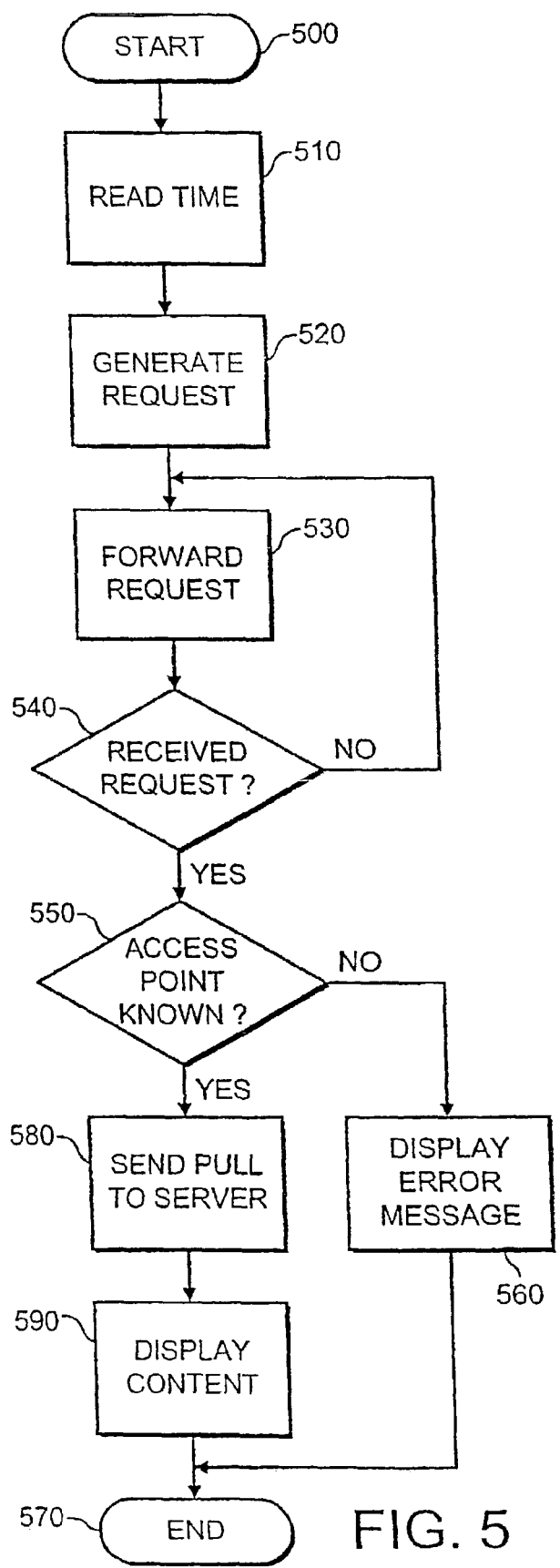
FIG. 5 shows a flowchart over a method for fetching content from a server to a cellular telecommunication terminal, according to the present invention.

FIG. 5 shows a flow chart, in accordance with the present invention, describing a way of fetching content from a server through a cellular communication terminal. The cellular telecommunication terminal in this example is the same type as described in FIGS. 2 and 3, and the apparatus is hereafter also referred to as a phone. The phone is provided with a browser application and a first memory which enables the user to browse among different objects on a server. This browsing can be done by using a browser application supporting WAP. When the phone is activated and establishes, a wireless connection to a cellular network, e.g. when the phone roams to a new network, "START" 500, it is possible to communicate with different telecommunication services, e.g. WAP related services, i.e. a service which can be accessed from a server to the phone. By using this kind of service, it might be possible to obtain information from a server to the phone, e.g. by using SMS (Short Message Service), or a similar service.

First, the user may select a browser menu on a display controlled by the browser application, which is connected to the first memory. In this browser menu the user can choose to establish a session to a server. To establish the session the user selects the service connected to the server from the menu. The selection is done by e.g. pressing on one of the softkeys as shown in FIG. 2. Then the browser application reads and identifies the content of an item from the first memory "READ ITEM" 510. This item comprises at least one access point, which indicates the location of the server to be accessed. The item might comprise more content than the access point, e.g. it is possible to have data packets received from an earlier session which is updated upon a new session to the same access point. The first memory is also provided with an identifier, which is used to identify a first content at the server. This first content is associated with link content, provided at different locations in the server. It is also possible that the link content could be provided on another server. After reading the item from the first memory, the browser application generates a request, "GENERATE REQUEST" 520, in order to fetch a copy of the first content from the server, at the location indicated by the access point. Thus, the browser application is also provided to fetch copies of content provided by a server. This request comprising information of the access point to be accessed, and the identifier identifying the first content at the server. The information could for example be a URL address, where the server is located. The request is then sent through the transmitter as a data packet.

A pull could be described as the terminal uses the access point to access a location where the provider information is stored, and might also determine whether it has been updated and to retrieve it if necessary. In some cases it could also be possible to use a push, which could be described as the opposite to pull, i.e. the server maintains address data necessary to transfer updated information to the terminal.

In accordance with the present invention, the pull is further provided to fetch a copy of the first content and a copy of the link content simultaneously, by means of the request, generated by the browser application. To fetch content simultaneously, the request also comprises an instruction to the server to send a copy of the first content from a given location in the server, indicated by the access point, together with a copy of the link content, simultaneously. By simultaneously means that the requested content is being sent to the terminal, as a single response to the request, wherein the response can comprise one or several data packets sent in series. Thus, upon sending this request to the server, all link content associated with the first content is downloaded to the terminal.

For example, the user interface is displaying an option (see FIG. 6a), when using the browser application, giving the user an opportunity to download all or parts of the content related to a so called homepage. The location of the homepage, in the server, is indicated by the access point. In general, the content related to the homepage comprises several link content which is related to the same location of the homepage. There might also occur other links, which is related to another homepage, at another location, which means that the total amount of content could be quite large. Therefore, in a preferred embodiment of the present invention, the first content and the link content, to be downloaded into the phone, could be restricted to the same server. Naturally, it can be possible that the server first sends information about the content provided on the server, like the number of content, the size of the content, content to other locations, etc. In this manner, it will be possible for the user to choose what content he would like to receive, and receive the content upon a downloading request, i.e. by using the pull means provided in the browser application.

The request is then transmitted to the linking means, "TRANSMIT REQUEST" 530, in order to establish a session between the link and the terminal. The link could be a gateway or a proxy server, which links the requested information to the correct access point. If the links do not respond to the request, "RECEIVED REQUEST?" 540, e.g. because the link is broken or the terminal does not have coverage to the cellular network, the terminal could receive an error message, which says that a connection to the link could not be established. Then, the user could choose to re-send the request once more, "TRANSMIT REQUEST" 530.

The item can comprise a script, which is arranged to provide provisions for accessing servers through the linking means. The script can activate or download linking applications from a gateway, i.e. an application which makes it possible to receive and/or transmit different types of data packets between the server and the terminal. For example, the different types of data packets can be a particular text format, software programs, different picture formats, etc. This allows a standard WAP browser to be used and provides flexibility for new features. This can be done by creating extensions to WML and WML script. Thus, the script can make it possible to access data packets, which might not be supported by the software in the terminal, by downloading the appropriate application, supporting the type of data format, directly to the terminal. In general, the data packets, is data (content) stored or generated at an origin server. The content of the data packet is to be displayed or interpreted by the client.

After the terminal has been connected to the link, the link can control that the access point is correct, "ACCESS POINT KNOWN?" 550. For example, if the user has requested access to a server which no longer exists, is misspelt, or for some other reason is no longer known, the linking means could transmit an error message. This error message could then be displayed on the terminal, "DISPLAY ERROR MESSAGE" 560, providing the user with information about the error. Then the session could be terminated, either by the user or the link, "END" 570. If the access point is known, the link can send a pull to the server, "SEND PULL TO THE SERVER" 580.

Finally, when the server has sent the requested information to the link, the information will be linked (pushed) further from the link to the terminal, "DISPLAY CONTENT" 590. However, it is not necessary to display the received content, e.g. it could be directly stored in the first memory. Also, in a preferred embodiment, the first and the linking content can be stored in a second memory, e.g. a cache memory which enables the user to temporarily store the fetched content. Finally, the session could be terminated, either by the user or the link "END" 570.

The User Interface.

With reference to FIGS. 6a, 6b and 6c, an example is shown of how the display in a user interface can act when accessing a server according to the present invention. The user interface may comprise the same elements as shown in FIG. 2, i.e. a keypad 2, a display 3, an on/off button 4, a speaker 5 and a microphone 6. Also, the terminal is provided with control 18 as shown in FIG. 3, which controls the user interface. Starting from FIG. 6a, there is a layout 31 presented on a display in a phone, as shown in FIGS. 2 and 3, which indicates signal strength 35 from the cellular telecommunication network "D1 Telekom" 40, the battery power 45 and a clock showing the time 50 in hours and minutes. Preferably, the display in the phone is an LCD (Liquid Crystal Display) display. The display, can be controlled by the control.

The layout 30 presents an example of the phone in idle mode, i.e. when the phone is activated and awaiting an action, e.g. an incoming or outgoing call. In the bottom of the display there are two items which are denoted as "Menu" 55 and "Names" 60. If the user selects "Names" 60 the user can e.g. access a built in phone book, If the user selects "Menu" 55, the user can select among several different menus. The actual selection of features in the bottom of the display, like "Menu" and "Names", can be selected by means of the soft keys disclosed with reference to FIG. 2.

One of the menus can be the next layout 65 called "Browser" 70. If the user chooses to use this menu, the user can access different telecom related information services, e.g. Internet. One way of accessing this kind of information is to use the Wireless Application Protocol, WAP.

If the user chooses to select "Home" 71, this may lead to the next layout 75, which graphically indicates, "Connecting to Service" 80. This shows an example of how the phone is trying to establish a connection to e.g. Internet, by sending an access request, through a first gateway, to a server. If a connection is established to the first gateway, some kind of welcome text for a home page might be displayed, "Welcome to D1 Web." 90. If the user selects "Options" 90 a list of selections can be displayed as shown in the following layout 101. For example, the different options could be "Fetch content" 102, "Go to links" 103 and "End" 104. If the user chooses the option "Fetch content" 102, the browser application will generate a request to fetch a copy of a first content and a copy of the link content simultaneously. To fetch content simultaneously, the request also comprises an instruction to the server to send a copy of the first content from a given location in the server, together with a copy of the link content, simultaneously. By simultaneously means that the requested content is being sent to the terminal, as a single response to the request, wherein the response can comprise one or several data packets sent in series. Thus, upon sending this request to the server, all link content associated with the first content is downloaded to the terminal. This leads to the next layout 105, which graphically indicates, "Fetching content" 106. This shows an example of how the phone is trying to send a pull to the server, by sending a request to the server. When a connection has been established, the content is pushed to the terminal.

When the user has received the requested content successfully, the user will have the same possibilities to browse around in the content as if the user was connected to the server. In this example, the received content is displayed with reference to FIG. 6b and FIG. 6c. The numbers which refers to FIG. 6b are 110-210. If the user selects "Options" 90 a list of selections can be displayed as shown in the following layout 110. For example, the different choices, could be "Currency converter" 115, "White pages" 120, "Pizza" 125 "CNN" 130, etc. In this example the user selects to use the currency converter 115, and browses further to the service in the next layout 135. In this layout 135 a browser display is shown with the selected item, which is indicated as a link to a service which provides a currency conversion. The user can select to choose this item, by using the "Options" 140.

For example, the layout can be provided with different editable fields and selection list placeholders, which in this example are shown in square brackets ([ ]). The selection which is highlighted can indicate a default state of the selection. In these fields, the user can input an amount, "Amount:[ ]" 165, in one currency, "From:[DKK]" 170, converted into another currency, "converted to:[DKK]" 175. When the user is going to enter an amount 185, e.g. 200, on how much he/she would like to convert, the layout may e.g. change its outlook like it does in layout 180. Thereafter, the user may press Ok 190, whenever he/she is done, or clear the amount by selecting "Clear" 191.

The steps for choosing a first currency to convert from 170, and choosing a second currency to convert to 175, are repeated in the layouts 195-205. Thereafter, the user may select "Options" 210, in layout 205, which in this example activates the calculation of the currency conversion and displays the result 220 in the next layout 215. If the user wishes to continue with user currency conversion, and chooses another currency to convert to, the user selects the option "converted to [DKK]:" 225, which becomes highlighted upon selection, and is shown in layout 230. The following reference numbers refers to FIG. 6c: 215-270. In the next layout 235, a selection list of available currencies is displayed. The user selects e.g. USD 240, and selects the entry by selecting "Ok" 245. The next layout 250 highlights the selected currency USD 255 to convert to. Thereafter, the user may select "Options" 260, which in this example once again activates the calculation of the currency conversion and the result "[USD]: 36,36" 265 is displayed with the selected information in the next layout 270.

The invention is not limited to the above described and in the drawing shown an example of embodiments but can be varied within the scope of the appended claims. For example, it can be further possible to restrict the download of content, by providing an option to the user to specify which link content the user would like to fetch a copy there of.

The invention claimed is:

1. A cellular communication terminal comprising:
a receiver and a transmitter configured to receive and transmit data packets according to the Wireless Application Protocol from at least one server through a gateway or proxy server which transmits the data packets between the terminal and at least one server;
a first memory comprising an identifier and at least one item, the at least one item having an access point which indicates a location of the at least one server to be accessed, wherein the at least one server is accessible by sending the identifier to the gateway or proxy server to identify a first content to be accessed at the at least one server, and wherein the first content is associated with link content provided at different locations in the at least one server or in another server;
a processor configured to provide a Wireless Application Protocol Environment including a Wireless Application Protocol browser which is configured to read an item from the first memory and to establish a session to the gateway or proxy server, and to fetch a copy of the first content from the at least one server at the location indicated by the access point, to be stored in the first memory or in a second memory, wherein the second memory is arranged to store temporarily or permanently the copy of the first content;
a user interface connected to the processor, the user interface including a display configured to display the copy of the first content received from the at least one server and a user input configured to control the processor;
wherein the receiver and transmitter are configured to fetch a copy of the first content and a copy of the link content simultaneously upon a request generated by the processor in accordance with the Wireless Application Protocol, the transmitter configured to send the request as a data packet, comprising an instruction to the at least one server to send the copy of the first content from a given location in the at least one server, indicated by the access point, together with a copy of the link content, simultaneously; and
wherein the terminal is cellular phone.

2. The terminal according to claim 1, wherein the first content and the link content is provided in the same server.

3. The terminal according to claim 1, wherein the Wireless Application Protocol browser comprises a pull means which includes a selecting means in order to choose which content is to he fetched.

4. The terminal according to claim 1, wherein the second memory is an external memory, provided with a connection to the terminal.

5. The terminal according to claim 1, wherein the second memory is in the terminal.

6. The terminal according to claim 1, wherein the second memory is a cache memory.

7. The terminal according to claim 1, wherein the first memory is a SIM card.

8. A method comprising:
reading an item in first memory and an identifier, the item comprising at least one access point indicating the location of a server to be accessed;
generating a request in accordance with the Wireless Application Protocol, the request comprising information of the at least one access point, and the identifier identifying a first content of the at least one access point, the first content being associated with link content provided at different locations in the server or in another server;
initiating a session to a gateway or proxy server according to the Wireless Application Protocol, by transmitting the request from the cellular communication terminal to the gateway or proxy server, the gateway or proxy server sending data packets between the terminal and the server; and
establishing a session between the terminal and the gateway or proxy server according to the Wireless Application Protocol, wherein the request has an instruction to the server to send a copy of the first content from a given location in the server, indicated by the access point, together with a copy of the link content, simultaneously, and
fetching a copy of the first content and a copy of the link content simultaneously.

9. A method according to claim 8, wherein the copy of the first content and the link content is stored in a second memory.

10. A method according to claim 8, wherein the copy of the first content and the link content are from the same server.

11. A method according to claim 10, comprising fetching a copy of the link content from a further server.

12. A method comprising:

receiving data packets according to the Wireless Application Protocol from a cellular communication terminal;

within the data packets, receiving a request in accordance with the Wireless Application Protocol, the request comprising information of at least one access point indicating a location of the server to be accessed and an instruction to the server to send a copy of a first content from a location in the server together with a copy of link content simultaneously, wherein the first content of at least one access point is identified by an identifier and the first content is associated with the link content provided at different locations in at least one of the server and another server; and sending the copy of the first content and the link content simultaneously to the cellular communication terminal.

13. A method according to claim 12, wherein the copy of the first content and the link content are from the same server.

14. A method according to claim 12, wherein the copy of the first content and the link content is stored in a memory of a cellular communication terminal.

15. A computers program product, embodied on a non-transitory computer-readable medium comprising computer code configured to perform the processes of claim 12.

16. A server, comprising:

a processor unit; and a memory unit operatively connected to the processor unit and including:

computer code configured to receive data packets from a cellular communication terminal;

computer code configured to receive a request in accordance with the Wireless Application Protocol within the data packets, the request comprising information of at least one access point indicating a location of the server to be accessed and an instruction to the server to send a copy of a first content from a location in the server together with a copy of link content simultaneously, wherein the first content of at least one access point is identified by an identifier and the first content is associated with the link content provided at different locations in at least one of the server and another server; and computer code configured to send the copy of the first content and the link content from the server simultaneously to the cellular communication terminal.

17. A server according to claim 16, wherein the copy of the first content and the link content are from the same server.

18. A method of fetching content from a server, comprising:

transceiving data packets from at least one server during an established session according to the Wireless Application Protocol;

effectuating access to the server by receiving an access point indicating a location of the server to be accessed and an identifier identifying a first content to be accessed, wherein the first content is associated with link content provided at different locations in one of the server and another server; and participating in a fetching process comprising fetching a copy of the first content from the server at the location indicated by the access point and fetching a copy of the link content simultaneously in response to a request in accordance with the Wireless Application Protocol sent as a data packet included within the transceived data packets, the request including an instruction to the server to send the copy of the first content from a given location in the server indicated by the access point together with the copy of the link content, simultaneously.

19. A method according to claim 18, wherein the first content and the link content is provided in the same server.

20. A computer program product, embodied on a non-transitory computer-readable medium comprising computer code configured to perform the processes of claim 18.

21. A server, comprising:

a processor unit; and a memory unit operatively connected to the processor unit and including:

computer code configured to transceive data packets from at least one server during an established session according to the Wireless Application Protocol:

computer code configured to effectuate access to the server by receiving an access point indicating a location of the server to be accessed and an identifier identifying a first content to he accessed, wherein the first content is associated with link content provided at different locations in one of the server and another server; and computer code configured to participate in a fetching process comprising fetching a copy of the first content from the server at the location indicated by the access point and fetching a copy of the link content simultaneously in response to a request in accordance with the Wireless Application Protocol sent as a data packet included within the transceived data packets, the request including an instruction to the server to send the copy of the first content from a given location in the server indicated by the access point together with the copy of the link content, simultaneously.

22. A server according to claim 21, wherein the first content and the link content is provided in the same server.

23. A computer program product, embodied on a non-transitory computer-readable medium for fetching content from at least one server comprising:

computer code configured to receive and transmit data packets according to the Wireless Application Protocol from at least one server through a link which transmits the data packets between the terminal and the at least one server;

computer code configured to store in a first memory, an identifier and at least one item, the at least one item is provided with an access point which indicates a location of the at least one server to he accessed, wherein the at least one server is accessed by sending the identifier to the link to identify a first content to be accessed at the at least one server, and wherein the first content is associated with link content provided at different locations in the at least one server or in another server;

computer code configured to establish a session according to the Wireless Application Protocol to the link by reading an item from the first memory, and fetching a copy of the first content from the at least one server, at the location indicated by the access point, to be stored in the first memory or in a second memory, wherein the second memory temporarily or permanently stores the copy of the first content;

computer code configured to display the copy of the first content received from the at least one server and a user input which controls the browser application; and computer code configured to fetch a copy of the first content and a copy of the link content simultaneously upon a request generated by the browser application in accordance with the Wireless Application Protocol, the request being sent through a transmitter as a data packet, comprising an instruction to the at least one server to send a the copy of the first content from a given location in the at least one server, indicated by the access point, together with a copy of the link content, simultaneously.

24. A computer program product according to claim 23, wherein the first content and the link content is provided in the same server.

* * * * *